INVENTORS:
Clarence J. Coberly,
Robert G. Wulff,
By
ATTORNEY.

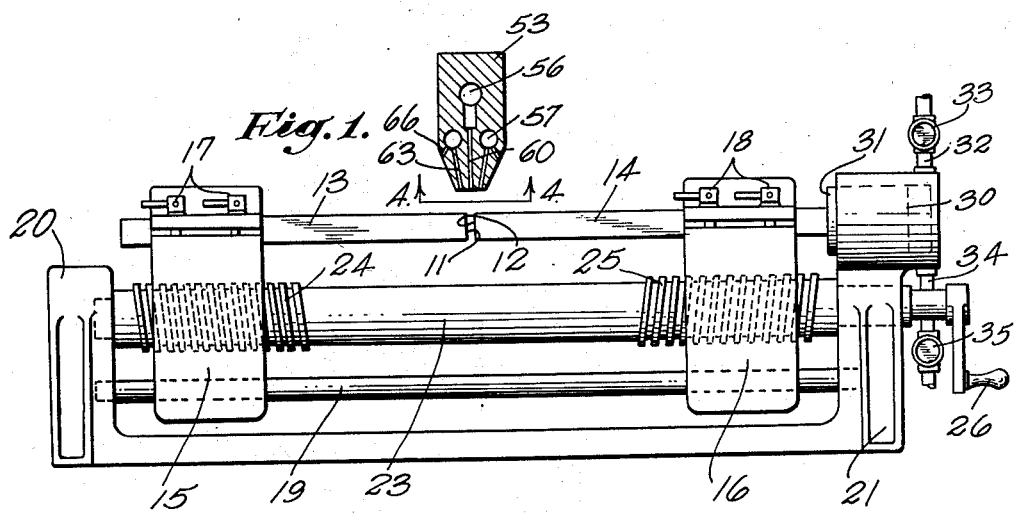
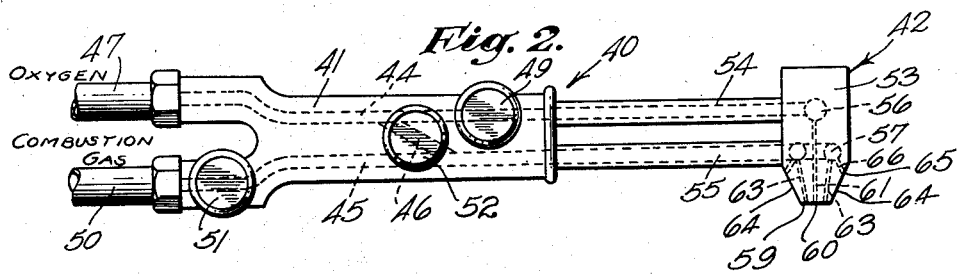
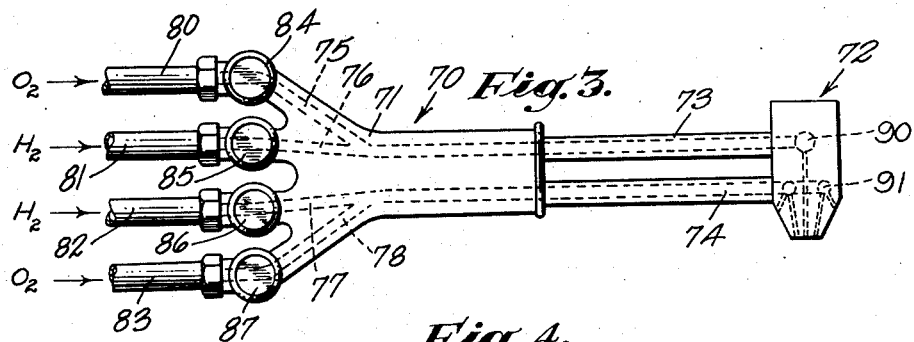
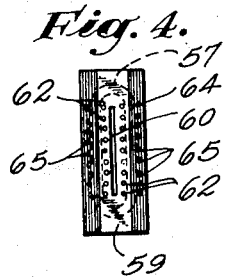
INVENTORS:
Clarence J. Coberly,
Robert G. Wulff,
BY
ATTORNEY.

Patented May 12, 1936

2,040,240

UNITED STATES PATENT OFFICE 2,040,240

PROCESS OF BUTT-WELDING

Clarence J. Coberly and Robert G. Wulff, Los Angeles, Calif.; said Wulff assignor of one-half of his right to said Coberly Application November 14, 1932, Serial No. 642,590

13 Claims. (Cl. 78—94)

Our invention relates to a process of butt-welding steel or steel alloys. More particularly it relates to a novel process of butt-welding by the use of a high velocity stream of gas which may take the form of a high velocity stream of oxygen forming a cutting jet.

Butt-welding processes are ordinarily performed by electrical methods which require large amounts of energy. Experience has shown that the energy requirements are so high as to almost preclude the possibility of portable use of such electric welding, especially on certain types of work. The apparatus necessary to butt weld two objects by electrical methods must often be of sufficient capacity to deliver two thousand kilowatts over short periods of time, thus requiring massive aparatus which can only be successfully used in permanent installations. In the present process it has been found to be entirely practical to utilize a high velocity jet of gas for preparing a welding surface. Such a jet may take the form of a high velocity jet of oxygen which is readily available. With such a jet the heat available from oxidation may be as high as 250 k. w. per sq. in. of welded area. By proper design it is possible even with conventional oxygen storage tanks to release amazing amounts of energy. A single cylinder of oxygen can be drawn from at a rate that will deliver 400 k. w. of heat energy. Thus, it is possible to liberate the heat equivalent of approximately five thousand horsepower by the use of apparatus which is readily portable.

It is an object of the present invention to provide a method and apparatus which is simple and compact and which can be readily transported from place to place if desired.

It is a further important object of the invention to provide a butt-welding process in which the faces to be joined are prepared by passing a high velocity jet of gas therebetween, this jet of gas in one embodiment of the invention taking the form of a jet of oxygen.

In the preferred mode of operation of the invention, we bring the two members to be welded into adjacent relationship, and after a suitable preheating we pass a high velocity jet of gas therebetween. If this jet of gas is in the form of a cutting jet of a high velocity stream of oxygen, this oxygen ignites the material forming these faces and trims these faces. If the sheet of oxygen is of uniform thickness and neither materially spreads nor diverges as it moves between these members, the faces will be trimmed into parallelism. These faces are in such a molten condition that if the cutting jet is suddenly removed and the parallel faces brought into pressural contact, a perfect weld can be obtained.

It is an important object of the present invention to utilize a cutting jet for trimming the ends of the members which are to be butt welded.

A further object of the invention is to form this cutting jet in the form of a sheet of oxygen which moves between the members to be welded and trims the surfaces to be welded into parallelism.

A further object of the invention is to provide a process and apparatus wherein the high velocity jet of gas is removed an instant before the faces are brought into contact, and to provide a suitable device for bringing these faces into pressural contact immediately upon the removal of the high velocity stream of gas.

It is a further object of the invention to advance the members relative to the high velocity stream of gas, thereby continuously removing material from the welding faces and insuring a parallel relation therebetween.

It is a further object of the invention to regulate the degree of preheating with respect to the time interval between the removal of the cutting jet and the bringing of the members into welding contact so that the faces may be at welding temperature when brought into contact.

While ordinarily the high velocity stream of gas is an oxidizing one, this is not essential to the process, and it is a further object of the invention to provide a process and apparatus in which the faces to be welded are prepared by a reducing flame moved therebetween.

The invention finds utility in butt-welding various shapes of members, but it is particularly valuable in welding lengths of pipe end to end during installation of a pipe-line, for instance.

It is an object of the invention to produce an improved process of butt-welding sections of pipe by passing an annular stream of gas between the faces to be welded and subsequently moving these faces into engagement with each other.

Other objects and advantages of our invention will appear and be more fully understood from the following detailed description, reference being had to the accompanying drawings which illustrate diagrammatically several forms of the invention.

Referring to these drawings,—

Fig. 1 is a diagrammatic view of one form of apparatus arranged to carry out the invention in butt-welding a pair of bars.

Fig. 2 is a view of the torch used in this form of our invention.

Fig. 3 is an alternative torch used in a modified process.

Fig. 4 is a view taken on the line 4—4 of Fig. 1.

Figure 5:
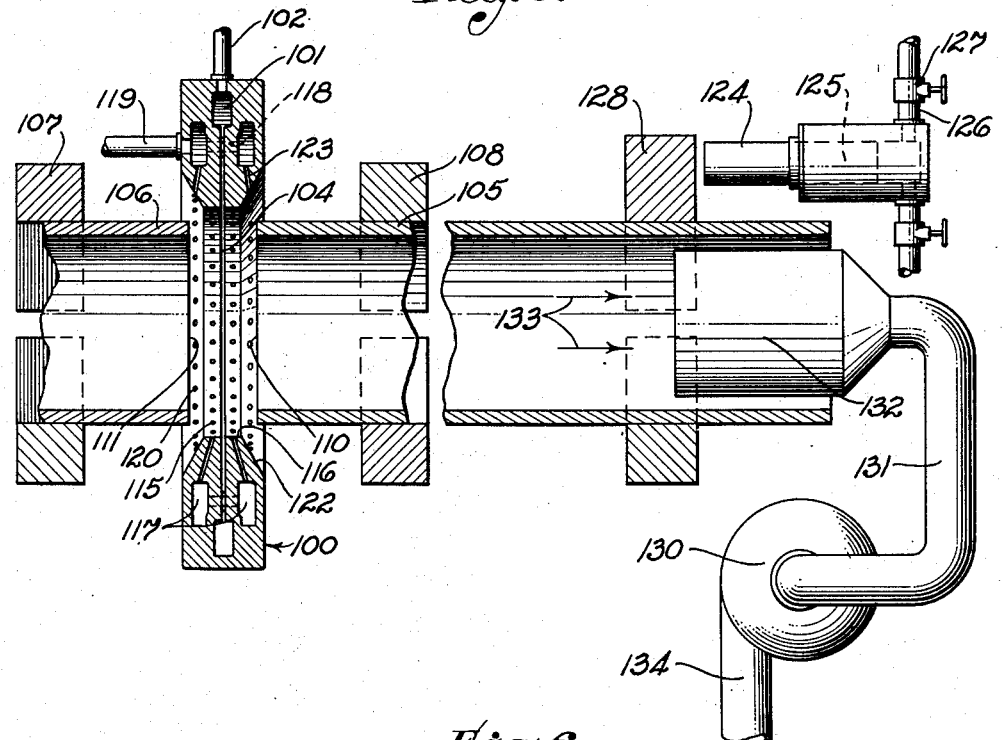
Fig. 5 is a sectional view of an apparatus for butt-welding two lengths of pipe.

The invention can best be illustrated by reference to Fig. 1 which shows the process adapted to the butt-welding of two bars. The numerals 11 and 12 indicate the faces of these bars which are to be welded, the bars being indicated by the numerals 13 and 14. It is preferable to respectively mount these bars in vises 15 and 16 which are in turn provided with clamping means 17 and 18 which control the clamping action. The clamping means 17 is usually adjusted so that it tightly clamps the bar 13, while the clamping means 18 is adjusted so that it clamps the bar 14 more loosely with respect to the vise 16 so that relative movement between the bar and the vise 16 can take place, as will be hereinafter described.

One or more guides 19 extend through the vises 15 and 16 so that these vises may slide therealong to move the bars 13 and 14 relative to each other. This movement is effected by a screw member 23 journalled in supports 20 and 21, opposite ends of this screw member being provided with right and left-hand threads 24 and 25 respectively, corresponding threads being formed in the vises 15 and 16. The screw member may be rotated by suitable means such as a crank 26. Thus, a rotation of the screw member 23 in one direction will move the vises 15 and 16 toward each other, while a movement of this screw member in the opposite direction will separate these vises.

Mounted on the support 21 is a cylinder 30 which slidably retains a piston 31 positioned adjacent the rear end of the bar 14. The piston 31 is fluid actuated by air or other fluid supplied through a pipe 32 provided with a quick-opening valve 33. An exhaust pipe 34 is also provided and includes a valve 35 through which the fluid may be subsequently discharged.

The torch utilized in this form of the invention is best illustrated in Fig. 2 and is indicated by the numeral 40. It comprises a body 41 and a torch-head 42 with suitable interconnecting means. The body 41 is provided with ducts 44 and 45 extending longitudinally therethrough, and with a duct 46 communicating between the ducts 44 and 45, as diagrammatically indicated. A pipe 47 communicates with the duct 44 and supplies oxygen thereto. A flow of this oxygen from the duct 44 is controlled by a quick-acting valve 49. Similarly, a pipe 50 supplies a combustible gas to the duct 45 in an amount controlled by a quick-acting valve 51.

The duct 46 connects the ducts 44 and 45 and a quick-opening valve 52 allows oxygen to flow into the duct 45 when this valve is opened.

The torch-head 42 comprises a torch-tip 53 which is supplied with gas through pipes 54 and 55 respectively communicating with the ducts 44 and 45. The pipe 54 communicates with a chamber 56 formed in the center of the torch-tip 53, while the pipe 55 communicates with an annular chamber 57. The lower face of the torch-tip is indicated by the numeral 59 and is spaced a slight distance from the bars 13 and 14, as shown in Fig. 1. A long flat slit 60 is formed in the center of this lower face and extends in a direction transverse to the bars 13 and 14, this slit communicating with the chamber 56 and forming an elongated orifice adapted to discharge a high velocity stream of gas between the bars 13 and 14. This stream of gas is in the form of a sheet, and the slit 60 is designed to discharge a stream of gas which neither materially spreads nor converges as it moves between the bars 13 and 14.

It is usually preferable to provide a plurality of small orifices 62 opening on the lower face 59 on opposite sides of the slit 60 and communicating with the annular chamber 57 through ports 63. It is preferable to provide the lower portion of the torch tip with angled surfaces 64, and it has been found preferable, though not in all instances necessary, to provide additional orifices 65 opening on these angled surfaces and communicating with the annular chamber 57 through ports 66. The orifices 62 and 65 form a convenient means for preheating the ends of the bars 13 and 14, the combustible gas issuing therefrom being ignited to effect this heating. Other preheating means may be used, as hereinafter mentioned.

In the operation of this form of the invention the bars 13 and 14 are clamped in the vises 15 and 16, as previously described, the clamping means 18 of the vise 16 being tightened only sufficiently to retain the bar 14 so that this bar can slide relative to the vise 16 when force is applied to the end of this bar by the piston 31. The bars are so positioned that their faces 11 and 12 are approximately equidistant from the cutting jet which issues from the slit 60. The faces 11 and 12 may be positioned a distance apart which is approximately the thickness of the cutting jet issuing from the slit 60, the spacing of the faces 11 and 12 being controlled by the crank 26.

The preferred mode of operation includes the step of preheating the ends of the bars 13 and 14 by opening the valves 51 and 52 and igniting the combustible gas issuing from the orifices 62 and 65. It is usually desirable to preheat the bars until the ends thereof are at or above ignition temperature. This preheating step seldom requires more than a minute, and can sometimes be completed in a fraction of this time. The desired temperature can usually be ascertained by noting the color of the ends of the bars 13 and 14, it being sufficient if the preheating is carried on until the ends of these bars are brought to a visible red heat.

The preheating must obviously not be carried to such an extent that the bars 13 and 14 are deformed due to their own weight, and preferably should not be carried to such an extent that excessive upsetting of the metal will take place when the piston 31 forces the faces 11 and 12 into engagement. The preheating step need only be carried to such an extent that the temperature of the faces 11 and 12 closest to the torch is at or above ignition temperature.

The valve 49 is now opened, and the jet of cutting oxygen issuing from the slit 60 ignites the metal forming the faces 11 and 12 thus setting up an oxidizing action on the metal. The screw member 23 is then turned so as to move the bars 13 and 14 toward each other. In effect, these bars are moved into the cutting jet, and this jet effectively trims the faces 11 and 12 into parallelism. It is only necessary to move the bars 13 and 14 toward each other a distance sufficient to effectively trim the faces 11 and 12, but during this movement the combustion of the metal at these faces further heats the ends of the bars and raises the temperature adjacent the faces 11 and 12 to a point at or above the welding temperature.

As soon as the faces 11 and 12 are heated to such a welding temperature and have been trimmed into parallelism, the cutting jet is removed and the faces 11 and 12 are brought into contact with each other. This may be accomplished by entirely removing the torch from the vicinity but is preferably accomplished by wholly or partially closing the valve 49 to shut off the high velocity flow of oxygen. The valve 33 is then immediately opened, and the fluid entering the cylinder 30 forces the piston 31 leftward and into contact with the end of the bar 14, sliding this bar relative to the vise 16 and into engagement with the bar 13 whereby the faces 11 and 12 are brought into surface contact with each other under a pressure controlled by the size of the piston 31 and the pressure acting thereon as well as by the inertia and friction forces of the piston 31 and bar 14.

It is very important that the faces 11 and 12 be brought into contact with each other before the temperature of these faces is reduced to a value below the welding temperature. In accomplishing this result, several factors must be taken into account, one of the most important of these factors being the time interval between removal of the cutting jet and the bringing together of the faces 11 and 12. If too long a time interval is allowed to elapse, the temperature of the faces 11 and 12 will be reduced through radiation losses or due to the heat conducted through these members. This heat conductivity factor is dependent both upon the size and composition of the members being welded and upon the degree of preheat, as well as the length of material preheated measured back from the faces 11 and 12. No set rules as to this time interval can thus be given, though in practical operation this interval must ordinarily be less than one second.

In view of the necessarily limited time interval between the removal of the cutting jet and the bringing of the faces 11 and 12 into contact, it is usually impractical to remove the torch from the vicinity of the weld, and the most satisfactory results have been obtained by entirely closing the valve 49 and opening the valve 33 an instant later. If the inertia forces of the piston 31 are high, or if this piston must move a distance before engaging the end of the bar 14, it may be necessary to open the valve 33 at or before the time that the valve 49 is shut off. The important time interval is, however, that interval measured between the removal of the cutting jet and the contacting of the faces 11 and 12. If the valve 49 is only partially closed, it is sometimes possible to make successful welds though care must be taken that the residual jet of oxygen will not gouge the metal when the welding operation begins.

It is also necessary to suitably control the pressure with which the faces 11 and 12 are forced together. The application of excessive pressures will cause an excessive upsetting of the metal, but it will be clear that the allowable pressures are in turn dependent upon the softness of the metal due to preheating. On the other hand, the action of the cutting jet of oxygen is an oxidizing one, and a small amount of oxide is present on the faces 11 and 12 at the instant they move into contact with each other. This oxide acts as a flux to assist the welding action, but the pressure applied to move these faces into engagement should be sufficient to squeeze this oxide from between the faces. No fixed unit pressure can be set forth in view of these factors which vary in different uses of the process, but ordinarily a unit pressure of 1000 pounds per square inch or more is desirable. We are not, however, limited to this pressure, since certain materials may be satisfactorily welded at lower pressures.

The pressure of the jet of oxygen is not critical, pressures between five and fifty pounds per square inch being satisfactory if used with suitably designed orifices. The jet of oxygen must, however, be of relatively high velocity so that it will trim the faces 11 and 12 as previously set forth. It is usually impossible to measure the actual velocity of such a jet of oxygen. Instead, the apparent velocity of the jet is calculated from a knowledge of the dimensions of the orifice and the pressure utilized. Best results are obtained if the apparent velocity of the jet of oxygen is between four hundred and five thousand feet per second. With the velocity below four hundred feet per second it is difficult to obtain parallelism of the faces 11 and 12 unless small members are being welded.

With regard to the preheating of the ends of the members, this preheating may be carried out by any suitable heating means whether or not this heating means is directly associated with the torch. Thus, it is within the scope of this invention to utilize a separate heating means for applying heat to the ends of the members to be welded, the only requirement being that the heating means bring the faces 11 and 12 or a portion thereof to the ignition temperature so that upon application of the jet of oxygen a trimming action will take place. In the preferred embodiment of the invention this heating means is formed by the orifices 62 and 65, thus providing a unitary construction which is usually desirable. The heating gas moved through these orifices may be a mixture of oxygen and acetylene or a mixture of hydrogen and oxygen. In other instances any commercial heating gas may be utilized, and satisfactory results can be obtained by the use of natural or artificial gas.

Ordinarily the best welding action takes place if the members are preheated a considerable distance back from the faces 11 and 12. The form of heating means shown in Figs. 1, 2, and 4 is particularly applicable to such a system, for the flame issuing from the orifices 62 impinges immediately adjacent the faces 11 and 12, while the flames issuing from the orifices 65 impinge against the members 13 and 14 a distance back from these faces. If a material portion of the ends of the members 13 and 14 is not preheated, there is of course an increased tendency for the heat to be conducted through the members and away from the faces 11 and 12 upon removal of the cutting jet.

It is possible to cut off the supply of heating gas at the same time that the valve 49 is closed. In other instances it is possible to remove the heating flame prior to the time that the valve 49 is closed, relying upon the heat developed by the cutting jet to maintain the ends of the members at the requisite temperature. In other instances it is possible to retain the heating jets even after the supply of cutting oxygen has been shut off or decreased through the action of the valve 49. Usually, however, there is no necessity for continuing the heating jets after contact between the faces 11 and 12 has been effected.

It should not be assumed, however, that the heating means must be thus formed. Thus, the preheating step may be wholly or partially carried out by means independent of the torch. Further, if a flame is used for this preheating, it is not essential that this flame be directed against the faces of the members nearest the torch. Such a flame can be directed toward the opposite faces of the members or toward the side faces thereof. In other instances combinations of these systems may be used, in some instances applying the preheating jets to all sides of the adjacent members to be welded. Nor is the use of jets essential, for other heating methods may be utilized, such for instance, as applying heat by the use of well-known electrical methods.

As an illustration of the practical operation of the process, the following observed results will indicate the values which may be satisfactorily used with one type of steel and when butt-welding bars one-half inch square. It should be understood, however, that the values herein set forth are only illustrative and that these values will vary with different sizes of materials, heat conditions, etc., as previously set forth. When such one-half inch bars are being welded, the preheating may be carried out until a material portion of the ends of the bar are at a red heat. Satisfactory results can be obtained if the material on the top surface of the bars is heated to approximately 950° F. for a distance of one-half to one inch from the faces 11 and 12. An oxygen pressure of twenty-five pounds per square inch is satisfactory, producing a cutting jet of an apparent velocity of approximately 1500 feet per second. The rate at which the members 13 and 14 are moved toward each other may be varied under wide limits, but with this size of material a rate of approximately three inches per minute will be found to be very satisfactory. Speeds above five inches per minute are ordinarily excessive and not only waste material but do not produce a perfect weld. If the speed is reduced below 0.4 inches per minute it is difficult to secure good welds with this size of material. Ordinarily it is only necessary to trim a small amount of material from the faces 11 and 12, especially if these faces are approximately parallel at the outset. Thus, a trimming of 5/64 of an inch is usually sufficient. This ordinarily takes a comparatively short period of time, usually a small fraction of a minute. With this size of material the time interval between removal of the cutting jet and contacting of the faces 11 and 12 should be relatively short, a period of 1/5 of a second or less being usually desirable. As to the unit pressure developed when the faces 11 and 12 are brought into contact, approximately 4000 pounds per square inch will give very satisfactory results on this size of material.

In general, if the process is properly carried out, it will be found that only a minute upsetting of the material takes place. Usually this upset does not extend outward more than 1/8 of an inch from the surface of the members being welded.

It should not be assumed that it is in all instances necessary to utilize a cutting jet of oxygen for preparing the faces. Thus, in a modification of our process it is possible to use a reducing flame of oxy-hydrogen in order to prepare these faces for the welding operation. A torch suitable for such a process is illustrated in Fig. 3 and indicated in general by the numeral 70. This torch includes a body 71 and a torch-head 72 suitably secured thereto as by pipes 73 and 74. The body 71 provides ducts 75 and 76 which intersect as shown, and ducts 77 and 78 also intersecting. These ducts are respectively connected to pipes 80, 81, 82, and 83 and are provided with valves 84, 85, 86, and 87. The pipes 80 and 83 are connected to a source of oxygen, and the pipes 81 and 82 communicate with a source of hydrogen. The ducts 75 and 76 after intersecting communicate with the pipe 73 and supply gas to a chamber 90 corresponding to the chamber 56 previously described, while the ducts 77 and 78 after intersecting communicate through the pipe 74 with an annular chamber 91 corresponding to the annular chamber 57 previously described. The orifices in the torch-head 72 are similar in position and shape to those shown in the torch-head 42.

In performing this modified process the members 13 and 14 are mounted as previously described, the faces 11 and 12 being spaced approximately 1/8 of an inch apart, this distance depending upon the distance across the jet issuing from the elongated orifice of the torch-head 72. The valves 86 and 87 are opened, and the preheating step is carried out as previously described. The ends of the bar should be raised to a visible red heat, and thereafter the valves 84 and 85 are opened so that a combustible mixture moves through the elongated orifice in the center of the torch-head 90 and between the faces 11 and 12. This mixture may, for instance, be composed of approximately one volume of oxygen and two volumes of hydrogen, and will heat the faces to at least a welding temperature, and preferably to a temperature considerably above the minimum welding temperature. Thereafter, the valves 84 and 85 are regulated so as to increase the hydrogen content of the jet to at least double its former value. A satisfactory mixture has been found to be approximately six volumes of hydrogen and one volume of oxygen, though this mixture is not invariable. The flame thus produced reduces all of the oxides on the faces 11 and 12 to the metal, and thereby prepares the faces for the production of strong sound welds. This reduction step requires from 1/10 of a second to three seconds when utilizing small members. The valves 84, 85, 86, and 87 are then closed, and the faces 11 and 12 are brought into contact as previously described. It will be noted that with this modification of the process the members 13 and 14 are not necessarily moved toward each other during the time that the oxy-hydrogen flame is moving therebetween.

It may be pointed out also that the pipe 82 supplies primarily a combustible gas, and that besides hydrogen, any other might suitably be used, such as city gas or acetylene.

A second modification of our process differs from the modification just described in that the valves 84, 85, 86, and 87 may be simultaneously opened to effect the preheating, after which the valves 84 and 85 may be adjusted to give a reducing flame.

A third modification consists of the following steps: first, valves 86 and 87 are opened to effect the preheating; second, valve 84 is opened to produce a high velocity jet of oxygen and the members 13 and 14 are moved toward each other to trim the faces; and, third, the flow of oxygen from valve 84 reduced and valve 85 opened to give a mixture of hydrogen and oxygen which will reduce the oxide on the faces to be welded. This modification provides, among other things, a means to trim the faces to be welded, or otherwise shape them to be suitable for the welding operation that follows.

One of the most important uses of the invention is in the butt-welding of sections of pipe. A welding head for such a process is diagrammatically shown in Fig. 5 and indicated by the numeral 100. This head provides an annular chamber 101 supplied with oxygen from a pipe 102 and communicating with an annular orifice 104 extending completely around the sections of pipe 105 and 106 which are to be welded. These sections of pipe are respectively held in suitable clamping means 107 and 108 similar to those disclosed in Fig. 1, and are positioned so that end faces 110 and 111 are disposed adjacent each other. In Fig. 5 these faces are shown spaced from each other a considerable distance so as to illustrate the details of the head 100. It will be understood, however, that during the preheating and at the start of the trimming operation these faces will usually be spaced a distance apart only slightly less than the width of the sheet of cutting oxygen issuing from the annular orifice 104.

The preheating step may be most conveniently carried out by the use of a series of orifices 115 positioned on each side of the annular orifice 104 and opening on an annular face 16 of the head 100, this annular face being slightly larger in diameter than the external diameter of the pipe. These orifices are supplied with a heating gas from annular chambers 117 intercommunicating through a series of ports 118 and supplied with heating gas through a pipe 119. The heating jets formed by these orifices impinge close to the ends of the sections of pipe 105 and 106. In addition, it is usually preferable to provide a series of orifices 120 on opposite sides of the annular orifice 104 and opening on angled faces 122 of the head 100. These orifices correspond to the orifices 65 previously described and are directed to impinge against the sections of pipe 105 and 106 a distance back from the faces 110 and 111. The orifices 120 are supplied with heating gas from the annular chambers 117 through ports 123 shown in the upper part of Fig. 5.

In the operation of this form of the invention the orifices 115 and 120 direct the heating gas so as to preheat the ends of the sections of pipe so that the faces 110 and 111 are raised to ignition temperature. Thereafter, an annular sheet of oxygen is forced through the annular orifice 104 and simultaneously trims all sections of both faces 110 and 111. During this trimming operation the faces 110 and 111 are advanced into the sheet of cutting oxygen as previously described, thus trimming the faces 110 and 111 into parallelism. Thereafter, the cutting jet is removed, and the faces 110 and 111 are brought into pressural contact with each other by a suitable device. Such a device is illustrated in Fig. 5 as comprising a piston 124 movable in a cylinder 125 supplied with a suitable fluid under pressure through a pipe 126 containing a valve 127. The piston may be positioned to engage the clamping means 108 or the end of the section of pipe 105, but most conveniently it engages a split ring 128 clamped to the section of pipe 105, the clamping means 108 permitting movement of this section of pipe.

During this welding operation it is desirable to move a stream of gas through the sections of pipe 105 and 106. Any suitable means may be utilized for accomplishing this end, but in the preferred embodiment we prefer to draw the gas through the pipe sections at a pressure slightly below atmospheric rather than to build up a pressure in these sections which is slightly above atmospheric. In accomplishing this end, a blower 130 may be utilized, the intake of this blower communicating with a pipe 131 and with a hood 132 which extends into the end of one of the sections of pipe. Air or other gas is thus drawn into the hood 132 as indicated by the arrows 133, this air or gas being discharged through a conventional discharge pipe 134 of the blower 130. This results in a slight decrease in pressure in the sections of pipe and establishes a stream of air or other gas moving therethrough to remove the material trimmed from the faces 110 and 111 through the action of the cutting jet. The velocity of this stream of gas is not high and is almost negligible as compared with the velocity of the jet of oxygen discharged from the orifice 104. However, even if the velocity of the gas moving through the pipe sections was increased to such an extent that the cutting jet would be slightly deflected, it is clear that no detrimental results would accrue in view of the fact that the faces 110 and 111 would still be trimmed in parallelism even though these faces were slightly conical.

Figure 6:
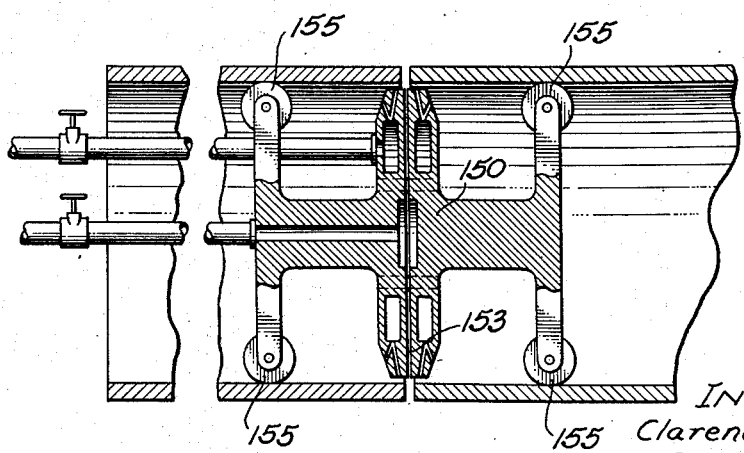
Fig. 6 is an alternative form of the invention.

The utilization of an annular cutting jet is an important feature of this form of the invention. It should not be construed, however, that this cutting jet must necessarily be directed radially inward with respect to the sections of pipe. It is sometimes possible to utilize a cutting jet which is directed radially outward, the head being positioned inside the sections of pipe. Such a system is diagrammatically shown in Fig. 6 which illustrates a head 150 inside the sections of pipe and directing an annular jet of oxygen outward from an orifice 153. Heating means similar to those previously described may be used or the ends of the pipe sections may be preheated externally by independent means. Suitable guide means such as wheels 155 may be utilized to centralize the head 150.

In all of the modifications of the process thus far described a sheet of gas has been passed between the faces to be welded, this sheet being of substantially uniform thickness so as to neither diverge nor converge, while preferably this is not always essential. Instead one or more small jets may be used and moved to sweep through the space between the members to trim the surfaces into parallelism. Such movement may be a continuous or alternating one.

The shape of the heating and cutting jet can be made to correspond to the shape of the material being welded. Thus, in the event that the rails are being welded it is desirable to change the contour of the torch to more nearly correspond to the contour of the rail. With other types of irregular shaped members corresponding variations in the shape of the torch and the mode of application of the preheating flame may be made without departing from the spirit of the invention.

The controlling factor in trimming the faces by the use of a cutting jet is to produce parallelism of these faces. As mentioned, if the members are advanced relative to the cutting jet at too fast a rate there is a tendency to destroy this parallelism, the faces being closer at the side of the members from which the cutting jet projects. This can, of course, be corrected by advancing the faces more slowly, but if the higher rate is desired it is still possible to obtain parallelism by utilizing a jet which diverges an amount corresponding to the variation from parallelism normally produced at such a rate of advance.

In general, it will be clear that our invention provides a system which is readily portable and which utilizes an entirely new method of butt-welding. That form of the invention which utilizes a high velocity cutting jet for trimming the faces to be welded is very advantageous, for it precludes the necessity of an accurate preliminary squaring of the faces to be welded as is necessary in electrical butt-welding processes. In our invention the faces to be welded are prepared for the welding operation just prior to the time that they are brought into contact with each other, and by proper manipulation of the process perfect welds can be obtained with a minimum of effort and within a very short period of time.

Other embodiments of the invention not shown will be apparent to those skilled in the welding art and fall within the scope of the appended claims.

We claim as our invention:

1. A process of butt-welding two members, which includes the steps of: bringing the faces to be butt-welded into adjacent position; preheating the material adjacent these faces to bring said faces to ignition temperature; directing a high velocity cutting jet which neither diverges nor converges any substantial amount while moving between said faces, thereby trimming said faces into parallelism; removing said cutting jet; and immediately bringing said faces into engagement with each other and while said faces are at welding temperature.

2. A process of butt-welding two members, which includes the steps of: passing a thin flat sheet of high velocity gas between the end faces of said members and of such width as to extend completely across said faces and of sufficient velocity to maintain the flame of substantially uniform thickness as it moves between said faces whereby said sheet of gas trims said end faces and brings them to a welding temperature; removing said sheet of gas; and bringing said end faces into engagement.

3. A process of butt-welding two lengths of pipe, which includes the steps of: bringing the end faces of said lengths of pipe into adjacent relationship; simultaneously trimming said end faces into parallelism by directing a sheet of flame therebetween; and bringing said end faces into contact with each other.

4. A process of butt-welding two lengths of pipe, which includes the steps of: bringing the end faces of said lengths of pipe into adjacent relationship; simultaneously trimming said end faces into parallelism by directing an annular cutting jet between said end faces and moving inwardly from outside said lengths of pipe; removing said cutting jet; and bringing said end faces into pressural contact with each other.

5. A process of butt-welding two lengths of pipe, which includes the steps of: bringing the end faces of said lengths of pipe into adjacent relationship; simultaneously trimming said end faces into parallelism by directing an annular cutting jet between said end faces and moving inwardly from outside said lengths of pipe; forcing a stream of gas through the interior of said lengths of pipe during the time said annular cutting jet is trimming said faces; removing said cutting jet; and bringing said end faces into pressural contact with each other.

6. A process of butt-welding two lengths of pipe, which includes the steps of: bringing the end faces of said lengths of pipe into adjacent relationship; preheating the material adjacent said faces to near the ignition temperature; directing a flame against said faces to trim them into parallelism and further heat said faces by their combustion; and bringing said faces into pressural contact with each other.

7. A process of butt-welding two lengths of pipe, which includes the steps of: bringing the end faces of said lengths of pipe into adjacent relationship; preheating more than a distance substantially equal to the length of pipe trimmed off said pipes adjacent said end faces; simultaneously trimming said end faces into parallelism and heating said faces to welding temperature without moving said pipe from the position in which it was preheated; and immediately bringing said faces into engagement with each other while said faces are at welding temperature.

8. A process of butt-welding two lengths of pipe, which includes the steps of: bringing the end faces of said lengths of pipe into adjacent relationship; preheating those portions of said pipe adjacent said faces; simultaneously trimming said end faces into parallelism with an oxygen jet and heating said faces to welding temperature, there being no interval of time between the cessation of said preheating step and the beginning of said trimming and heating step; and moving said faces into engagement with each other immediately upon the cessation of said trimming and heating step.

9. A process of butt-welding two members, which process includes the steps of: directing a high velocity jet of oxygen into the space between the end faces of said members and across these faces; causing a relative movement between each of said faces and said jet of oxygen whereby said jet of oxygen ignites said end faces and trims from said faces simultaneously an amount of material controlled by said movement to bring said faces into parallelism and to welding temperature; removing said jet of oxygen; and bringing said end faces into engagement.

10. A process of butt-welding two members, which process includes the steps of: directing a preheating flame adjacent the ends of said members whereby these ends are preheated to the ignition temperature; passing a high velocity oxygen cutting jet therebetween and simultaneously moving said members relative to said cutting jet, thereby trimming said ends to substantial parallelism and heating said ends to welding temperature; removing said jet; immediately directing a reducing jet between said ends whereby the oxide left thereon by said cutting jet is reduced; and immediately bringing said ends into engagement.

11. A process of butt-welding two members, which process includes the steps of: passing a thin flat sheet of high velocity gas between the end faces of said members and of such width as to extend completely across said faces and of sufficient velocity to maintain the flame of substantially uniform thickness as it moves between said faces; trimming said end faces into parallelism as well as bringing them to a welding temperature by relative movement of said faces and said sheet; removing said sheet of gas; and bringing said end faces into engagement.

12. A process of butt-welding two lengths of pipe, which process includes the steps of: bringing the end faces of said lengths of pipe into adjacent relationship; simultaneously trimming said end faces into parallelism by directing a sheet of flame therebetween and causing relative movement of said sheet and said faces; and bringing said end faces into contact with each other.

13. A process of butt-welding two lengths of pipe, which process includes the steps of: bringing the end faces of said lengths of pipe into adjacent relationship; preheating the material adjacent said faces to near the ignition temperature; directing a cutting flame between said faces; trimming said faces into parallelism and further heating said faces by their combustion by relative movement of said faces and said flame; and bringing said faces into pressural contact with each other.

CLARENCE J. COBERLY.
ROBERT G. WULFF.